(12) United States Patent
Fallows et al.

(10) Patent No.: US 7,056,362 B2
(45) Date of Patent: Jun. 6, 2006

(54) SEPARATOR TANK ASSEMBLY

(75) Inventors: Roger A. Fallows, Manchester (GB); Roger Cook, Warrington (GB)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 11/177,462

(22) Filed: Jul. 8, 2005

(65) Prior Publication Data
US 2005/0241283 A1 Nov. 3, 2005

Related U.S. Application Data

(62) Division of application No. 10/624,358, filed on Jul. 21, 2003, now Pat. No. 6,921,423.

(51) Int. Cl.
*B01D 35/14* (2006.01)
(52) U.S. Cl. ............... 55/360; 55/DIG. 17; 210/243
(58) Field of Classification Search ............... 55/360, 55/337, DIG. 17, DIG. 5; 210/243, 477, 210/497.01; 29/527.2, 896.62, 902; 264/129, 264/269, DIG. 48
See application file for complete search history.

(56) References Cited

U.S. PATENT DOCUMENTS

| | | | | |
|---|---|---|---|---|
| 2,523,083 A * | 9/1950 | Witkowski | ................. | 439/382 |
| 3,186,551 A * | 6/1965 | Dornauf | ................. | 210/243 |
| 3,471,261 A * | 10/1969 | Patterson | ................. | 436/161 |
| 3,721,071 A * | 3/1973 | Mueller et al. | ................. | 55/360 |
| 4,187,179 A * | 2/1980 | Harms | ................. | 210/238 |
| 4,350,590 A * | 9/1982 | Robinson | ................. | 204/661 |
| 4,396,045 A * | 8/1983 | Cain | ................. | 141/286 |
| 4,879,045 A * | 11/1989 | Eggerichs | ................. | 210/695 |
| 4,999,108 A * | 3/1991 | Koch et al. | ................. | 210/243 |
| 5,382,359 A * | 1/1995 | Brandt | ................. | 210/243 |
| 5,520,822 A * | 5/1996 | Sun | ................. | 210/748 |
| 6,099,726 A * | 8/2000 | Gembolis et al. | ................. | 210/243 |
| 6,179,904 B1 * | 1/2001 | Knowles et al. | ................. | 96/189 |
| 6,245,231 B1 * | 6/2001 | Maki et al. | ................. | 210/243 |
| 6,387,142 B1 * | 5/2002 | Pieciak et al. | ................. | 55/493 |
| 6,464,870 B1 * | 10/2002 | Castellanos et al. | ................. | 210/243 |
| 6,500,243 B1 * | 12/2002 | Cook et al. | ................. | 96/189 |
| 6,589,420 B1 * | 7/2003 | Mathew | ................. | 210/243 |
| 6,663,696 B1 * | 12/2003 | Miller et al. | ................. | 96/88 |
| 6,752,925 B1 * | 6/2004 | Bolduan | ................. | 210/243 |
| 6,921,423 B1 * | 7/2005 | Fallows et al. | ................. | 55/360 |
| 2002/0028150 A1 * | 3/2002 | Kawabata et al. | ................. | 418/55.1 |
| 2003/0034290 A1 * | 2/2003 | Tochikubo et al. | ................. | 210/243 |
| 2005/0016139 A1 * | 1/2005 | Fallows et al. | ................. | 55/358 |

FOREIGN PATENT DOCUMENTS

JP         2-48008   *  2/1990 ................. 55/360

* cited by examiner

*Primary Examiner*—Richard L. Chiesa
(74) *Attorney, Agent, or Firm*—Michael Best & Friedrich LLP

(57) ABSTRACT

A separator tank assembly including a separator tank having an interior chamber, a corrosion-resistant layer applied over at least a portion of the separator tank interior chamber, and a separator element positioned within the interior chamber of the tank. The separator element is electrically connected to a portion of the separator tank beneath the corrosion-resistant layer.

7 Claims, 4 Drawing Sheets

SEPARATOR TANK ASSEMBLY

RELATED APPLICATION DATA

This is a divisional patent application of U.S. patent application Ser. No. 10/624,358 filed on Jul. 21, 2003, now U.S. Pat. No. 6,921,423 the content of which is incorporated herein by reference.

BACKGROUND OF THE INVENTION

The present invention relates generally to a compressor system. More particularly, the present invention relates to an air/oil separator tank for use with an air compressor.

In many air compressor systems air is compressed in a compression chamber or airend of a compressor, for example, by a set of rotary screws, and a lubricant, such as oil, is injected into the compression chamber and mixes with the compressed air. The oil is generally injected into the compression chamber for a number of reasons including cooling the air compressor system, lubricating bearings, balancing axial forces and sealing the rotary screws. The oil must be removed from the stream of compressed air before the compressed air may be used downstream for pneumatic equipment and/or other tools.

In such air compressor systems, the compressed air and oil mixture discharged from the airend of the compressor typically flows with a high velocity into a separator tank where the air and oil of the air/oil mixture are caused to separate. The separator tank is usually cylindrical and the air/oil mixture is directed around an inner wall of a separation chamber. The combination of the centrifugal forces acting on the air/oil mixture and contact between the air/oil mixture and the inner wall of the separation chamber causes much of the oil to separate from the air/oil mixture, thereby allowing gravity to draw most of the oil downwardly into a lower portion of the separation chamber and also allowing the air to separate from the oil and flow upwardly into an upper portion of the separation chamber thereby achieving primary separation.

The compressed air, along with some fine oil droplets or mist entrained therein, then passes through a separator element placed within the upper portion of the separation chamber, thereby coalescing most of the remaining oil in the air stream to achieve secondary separation before the compressed air is transferred out of the separator tank. The coalesced oil pools in the bottom portion of the separator element and is returned to the airend of the compressor by a scavenging line.

SUMMARY OF THE INVENTION

As the air/oil mixture is separated, a potential difference may develop between the metal separator element and the metal separator tank. This potential difference, or static electricity, may increase the risk of flash fires caused by buildup of the static electricity within the separator element. To reduce the risk of such an occurrence, the separator element is preferably earthed, or grounded, to the separator tank.

In some separator tank configurations, the separator element includes a flange that is mounted on a ledge recessed a distance from the top of the separator tank. A lid is secured to the top of the separator tank and sealed by a gasket. or O-ring. The lid then utilizes a hold-down mechanism to secure the element flange to the ledge. Another gasket or O-ring seals the element flange to the ledge. In this configuration, the mating surfaces of the element flange and the ledge provide the earth path for grounding the separator element to the separator tank. For the earth path to exist, the mating surface of the ledge is required to be a machined, exposed surface. The mating surface of the ledge is machined to ensure a sufficiently flat surface for mating the element flange, and subsequently left exposed to provide metal-to-metal contact with the element flange. Since the ledge is within the separator tank, the ledge is subjected to any moisture within the tank and is often vulnerable to corrosion, possibly compromising the integrity of the earth path.

The present invention provides, in one aspect, a separator tank assembly including a separator tank having an interior chamber, a corrosion-resistant layer applied over at least a portion of the separator tank interior chamber, and a separator element positioned within the interior chamber of the tank. The separator element is electrically coupled to a portion of the separator tank beneath the corrosion-resistant layer.

The present invention provides, in another aspect, a separator tank assembly including a separator tank made from a corrosive metal, a corrosion-resistant layer applied over an interior portion of the separator tank, a corrosion-resistant metal block coupled to the interior portion of the separator tank such that the block is electrically connected with the tank, and a metal separator element positioned within the interior portion of the separator tank. The separator element is coupled to the block and electrically connected with the block.

The present invention provides, in yet another aspect, a method for manufacturing a separator tank assembly. The method includes applying a non-corrosive layer over at least an interior portion of a separator tank made from a corrosive material, positioning a separator element within the interior portion of the tank, and coupling the separator element to a portion of the separator tank not covered by the corrosion-resistant layer such that the element is electrically conductive with the separator tank.

DETAILED DESCRIPTION

The present invention will be described with reference to the accompanying drawing figures wherein like numbers represent like elements throughout. Certain terminology, for example, "right", "left", "front", "frontward", "forward", "back", "rear" and "rearward", is used in the following description for relative descriptive clarity only and is not intended to be limiting.

Figure 1:
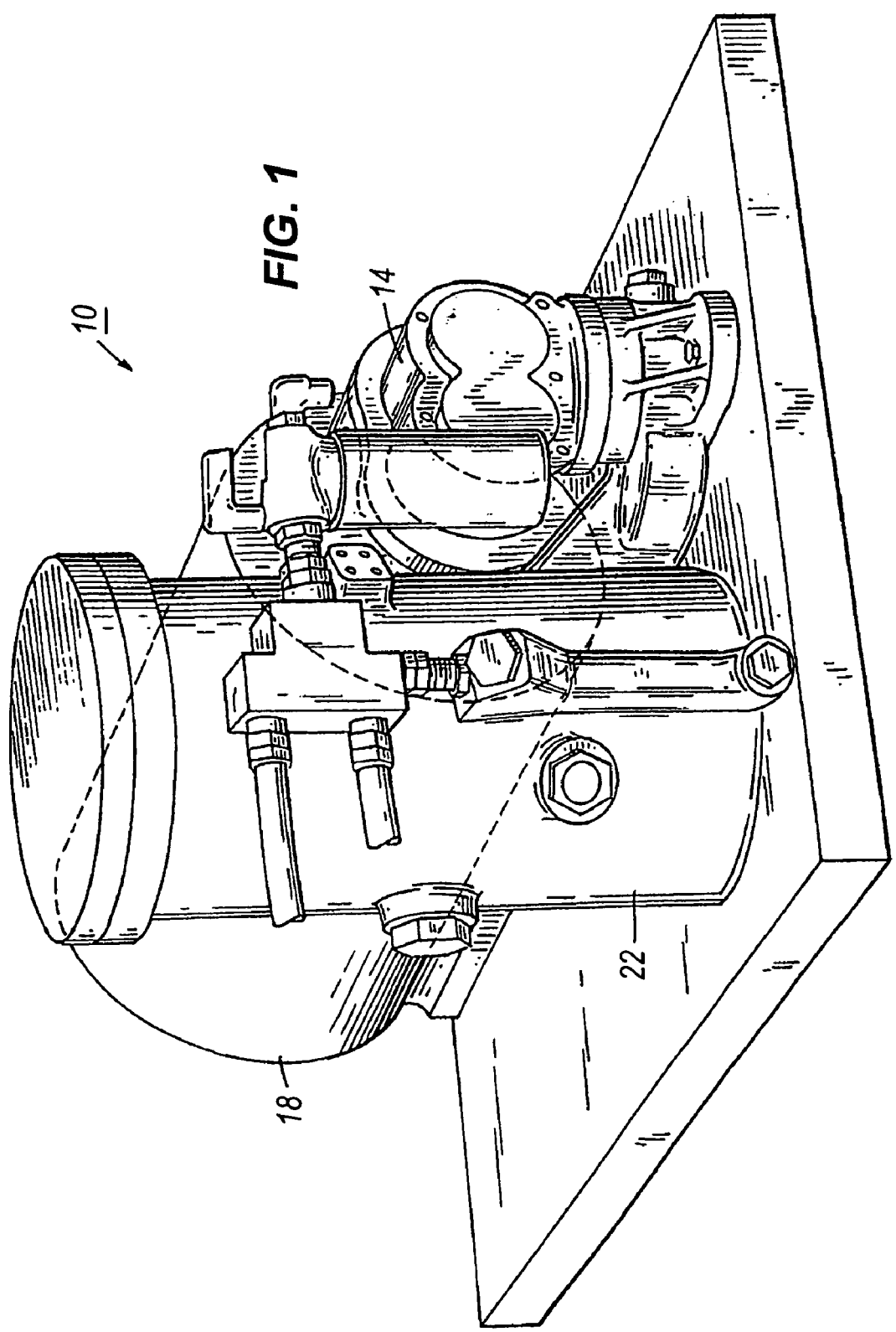
FIG. 1 is an isometric view of an air compressor system including a separator tank assembly embodying the present invention.

An air compressor system 10 utilizing a compressor 14, a motor 18, and a separator tank assembly 22 is illustrated in FIG. 1. It should be understood that the separator tank assembly 22 is capable for use in other compressor systems, however the illustrated air compressor system 10 is merely shown and described as an example of one such system.

Although the separator tank assembly 22 as disclosed herein is used to separate oil from an air/oil mixture, it is contemplated that the separator tank assembly 22 may be used to separate a volume of gas from any mixed media combination, including any gas/liquid combination. In addition, it is contemplated that the compressor 14 may be any suitable compressor 14, such as an oil-flooded air compressor. However, for purposes of description, the compressor 14 is a rotary screw compressor.

Figure 2:
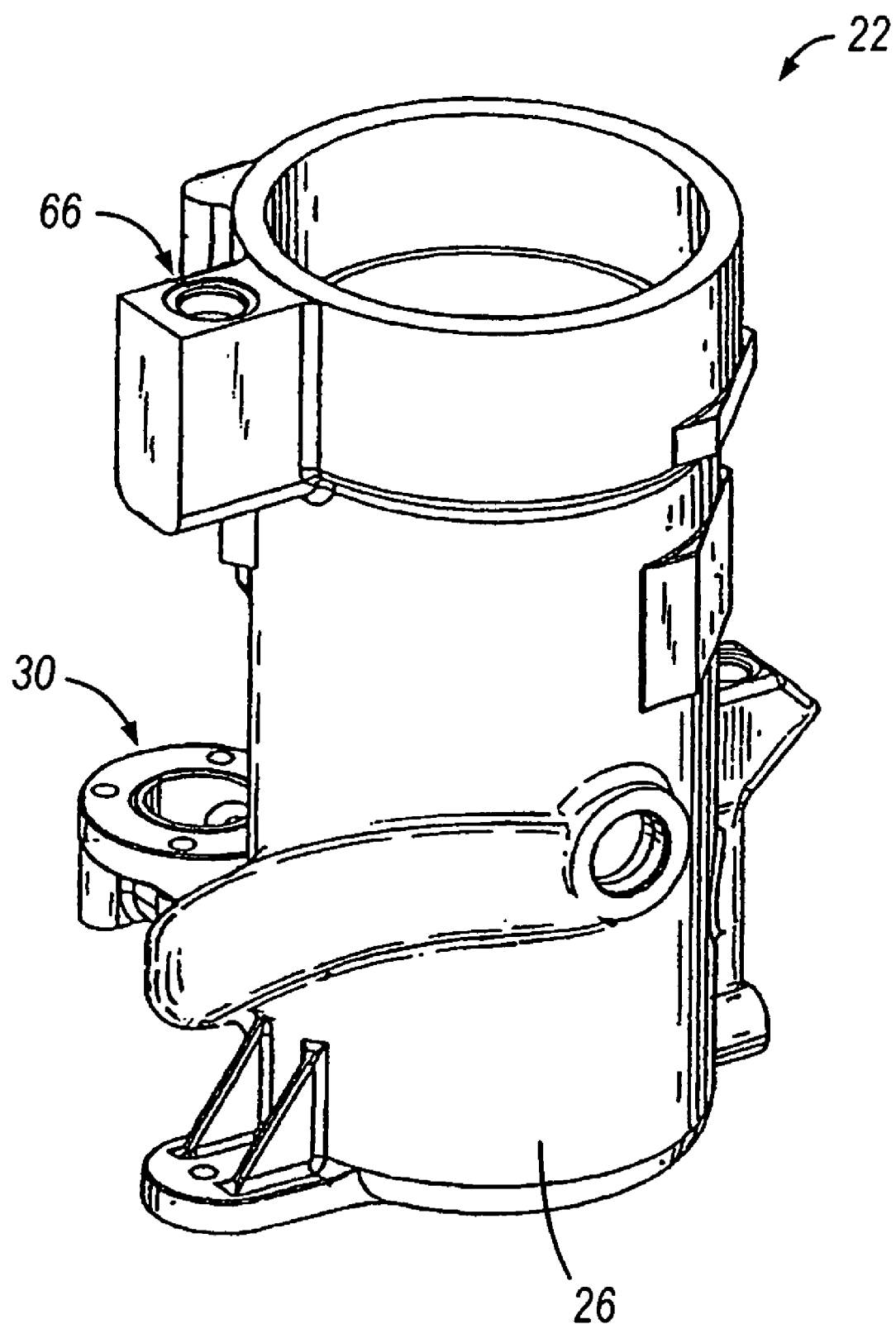
FIG. 2 is an isometric view of the separator tank assembly shown in FIG. 1.

The separator tank assembly 22 includes a separator tank 26 which may be constructed of any number of suitable materials. However, in a preferred construction, the separator tank 26 is cast from metal (e.g., cast iron). Air enters the compressor 14 and is compressed by rotary screws (not shown) found within the compressor 14. Oil is injected into the compressor 14 to lubricate the rotary screws and, if required, a gearbox (not shown) which drives the rotary screws. The oil further serves to seal the compressor 14. The compressed air and some of the oil travels out of the rotary screws through an airend discharge opening of the compressor 14 and into an inlet opening 30 (see FIG. 2) in the separator tank 26. The separator tank 26 serves to separate oil from the compressed air and also serves as an oil sump for the oil used to lubricate the rotary screws, the gearbox and other components. The compressed air and oil enter the separator tank 26 and are caused to undergo a cyclonic motion within the separator tank 26. As the compressed air and oil are whirled around an inner surface 34 of the separator tank 26, the oil slides down the inner surface 34 of the separator tank 26 and collects in the bottom of the separator tank 26. Further, the compressed air moves up and out of the separator tank 26 for subsequent filtering, cooling and ultimate use.

Figure 3:
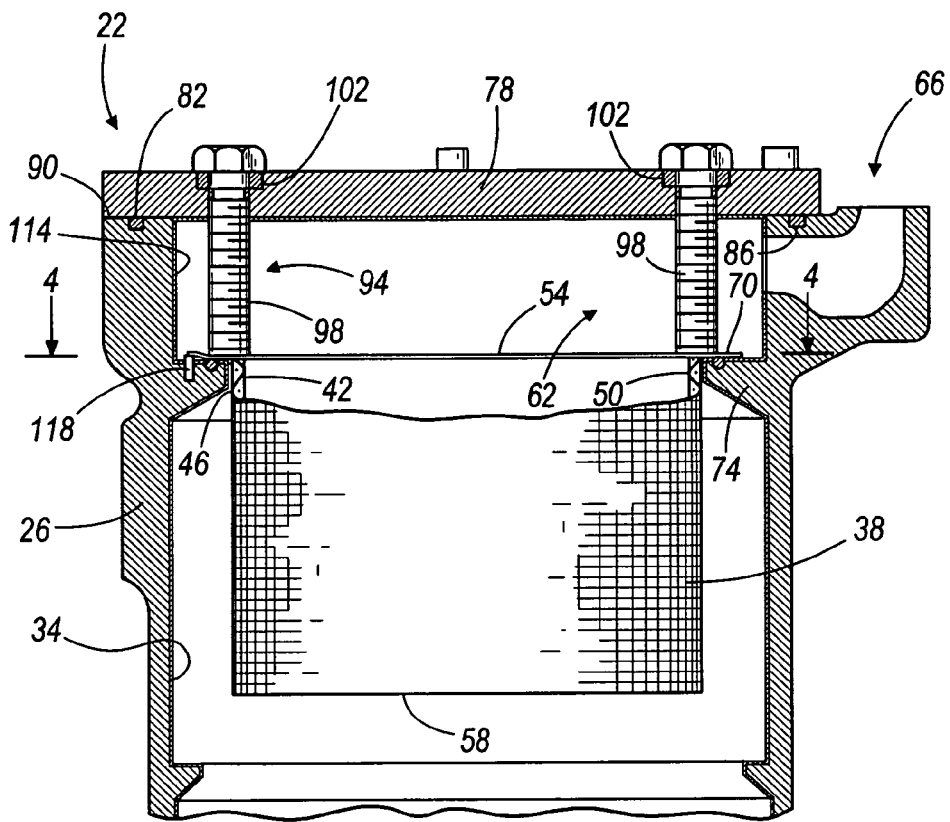
FIG. 3 is a cross-sectional view of the separator tank assembly, illustrating an earth path between the separator tank and a separator element.

Referring to FIG. 3, the separator element 38 is positioned in the separator tank 26 and has a cylindrical body including inner and outer perforated metal shells 42, 46, filter media 50 sandwiched between the shells 42, 46, an open top 54, a closed bottom 58, and an internal passage (represented by arrow 62) where substantially oil-free compressed air flows from the separator element 38 and out of the separator tank 26 via an air exit port 66.

The separator element 38 is placed within the upper portion of the separator tank 26. An annular flange 70 extends around the top portion of the separator element 38. The separator tank 26 includes a ledge 74 which extends circumferentially about the inner surface 34 of the separator tank 26. The flange 70 of the separator element 38 rests on the ledge 74. It should be noted that when the separator tank 26 is a cast separator tank 26, it is preferable for the ledge 74 to be an integrally cast member of the separator tank 26. As previously explained, air from the air/oil mixture introduced into the separator tank 26 flows upwardly into the upper portion of the separator tank 26 and through the separator element 38 before exiting via the air exit port 66.

A lid 78 is mounted on the separator tank 26 to enclose the separator element 38 therein. An O-ring 82 is positioned in an annular groove 86 extending around an upper surface 90 mating with the lid 78 to seal the lid 78 to the separator tank 26. When it is desirable to service or replace the separator element 38, the lid 78 is removed or pivoted out of the way to provide quick and easy access to the separator element 38.

With continued reference to FIG. 3, during operation of the compressor system 10, the air pressure inside the separator tank 26 yields an upwardly acting resultant force applied against the bottom of the separator element 38. Thus, a separator element hold-down mechanism 94 is provided between the separator element 38 and the lid 78 to position and hold the separator element 38 within the separator tank 26. The separator element hold down mechanism 94 may include a plurality of bolts 98 which threadably extend through the lid 78 and engage the flange 70 of the separator element 38 to hold the separator element 38 against the ledge 74 when the lid 78 is closed. Each bolt 98 may also include an O-ring 102 between itself and the lid 78 to better seal the air space provided between the bottom of the lid 78 and the top of the separator element 38. The separator element hold down mechanism 94 positions the separator element 38 away from the lid 78. The separator element hold down mechanism 94 may include many different shapes and configurations, including but not limited to the illustrated hold down bolts 98, metallic or non metallic preformed spacers etc, so long as it functions to position and hold the separator element 38 within the separator tank 26, and so long as it allows the air which travels through the separator element 38 to reach the air exit port 66 of the separator tank 26.

The ledge 74 includes an annular groove 106 for receiving an O-ring 110. The O-ring 110 is positioned between the flange 70 of the separator element 38 and the ledge 74 to provide an appropriate seal and to accommodate stack-up manufacturing/assembly tolerances in the separator tank assembly 22.

A corrosion-resistant layer or coating 114 (see FIG. 5a) is applied to the separator tank 26. The coating 114 is applied to the separator tank 26 over substantially all of the exposed surfaces within the tank 26. The corrosion-resistant layer or coating 114 may also be provided along a portion of the inside surface of the lid 78. The coating 114 helps prevent corrosion from forming inside the separator tank 26 due to the air/oil mixture contained by the separator tank 26. The coating 114 may also be applied over the outside of the separator tank 26, such that the surfaces not exposed to the air/oil mixture are coated. Such a corrosion-resistant coating 114 may include paint, among other types of coatings.

Figure 4:
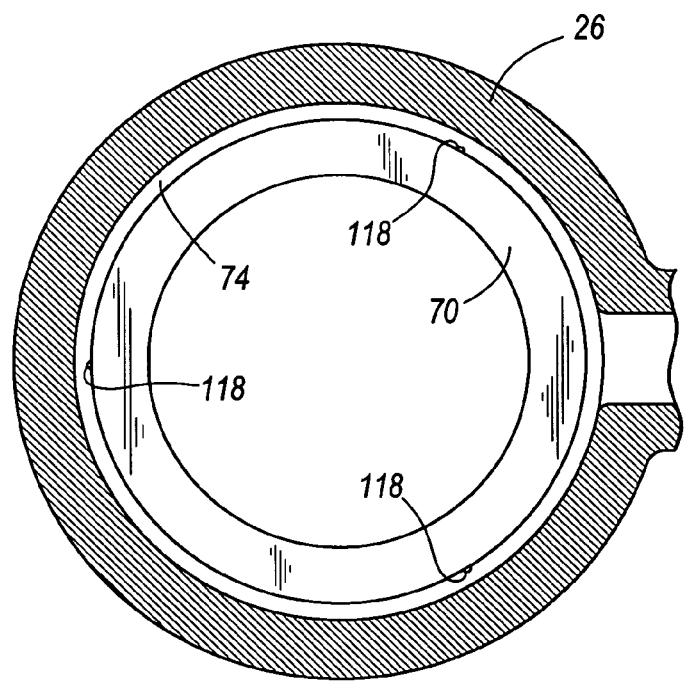
FIG. 4 is a cross-sectional view of the separator tank assembly of FIG. 3 along line 4—4, illustrating a top view of the separator element.

With reference to FIGS. 3–5a, metal stud 118 protrudes from the ledge 74 and is in physical and electrical contact with the flange 70. Preferably, the stud 118 is made from a corrosion-resistant metal, such as stainless steel. However, other compatible corrosion-resistant metals may also be used. In one construction of the separator tank assembly 22, multiple holes 122 are formed in the ledge 74 to snugly receive the studs 118 by way of a press-fit. The holes 122 may be formed by any of a number of known machining processes, or alternatively cast in the ledge 74 with the separator tank 26. As shown in FIG. 4, the holes 122 are formed in the ledge 74 such that the studs 118 are positioned toward the outer periphery of the flange 70. Also, in one construction of the separator tank assembly 22, three holes 122 are formed in an equi-angular relationship about the ledge 74 to receive three studs 118. However, other constructions of the separator tank assembly 22 may utilize more or fewer than three studs 118.

Upon being press-fit in the holes 122, metal-to-metal contact between the studs 118 and the separator tank 26 electrically connects the studs 118 with the separator tank 26. Further, upon assembling the separator element 38 with the separator tank 26, the flange 70 comes into physical contact with the studs 118 at multiple locations (three in FIG. 4) along the flange 70. Further, the flange 70 locally deforms in response to contacting the studs 118 when the separator element hold-down mechanism 94 engages the flange 70. As a result, the metal-to-metal contact between the flange 70 and the studs 118 forms an earth path between the separator element 38 and the separator tank 26 such that the separator element 38 is grounded to the separator tank 26. The earth path between the separator element 38 and the separator tank 26 substantially prevents static electricity from accumulating on the separator element 38.

If it is desired to replace a used separator element 38 with a new separator element 38, the lid 78 is removed, the used separator element 38 removed, the new separator element 38 positioned in place, and the lid 78 replaced. The action of securing the lid 78 to the separator tank 26 causes the hold-down mechanism 94 to engage the flange 70 to locally deform the flange 70 about the studs 118 to form a new earth path between the separator element 38 and the separator tank 26. Further, the studs 118 do not require cleaning to remove accumulated corrosion since they are made from a corrosion-resistant metal.

Figure 5A:
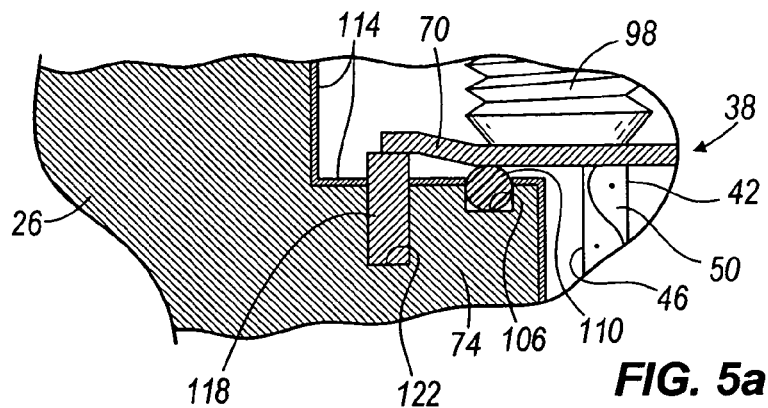
FIG. 5a is an enlarged, cross-sectional view of a portion of the separator tank, illustrating the earth path of FIGS. 3–4.

With the separator tank assembly 22 of FIG. 5a, the top surface of the ledge 74 does not require extensive machining to ensure a sufficiently flat surface for contacting the flange 70 and forming the earth path. Rather, the studs 118 protrude from the ledge 74 and cause local deformation of the flange 70 about the studs 118 to provide the earth path between the separator element 38 and the separator tank 26. Also, the top surface of the ledge 74 is not left exposed to the corrosive air/oil mixture. Rather, the top surface of the ledge 74 is coated to prevent exposure to the corrosive air/oil mixture. In the preferred method of manufacture, the interior of the tank 26, including the ledge 74 is machined, cleaned and coated with the corrosion-resistant layer 114 prior to forming of the holes 122 in the ledge 122. As such, the holes 122 extend through corrosion resistant layer 114 and allow metal-to-metal contact between the studs 118 and the separator tank 26. Alternatively, if the holes 122 are formed during manufacture of the tank 26, the holes 122 may be masked during application of the corrosion-resistant layer 114 such that the unobstructed metal-to-metal contact between the studs 118 and the separator tank 26 may be formed.

Figure 5B:
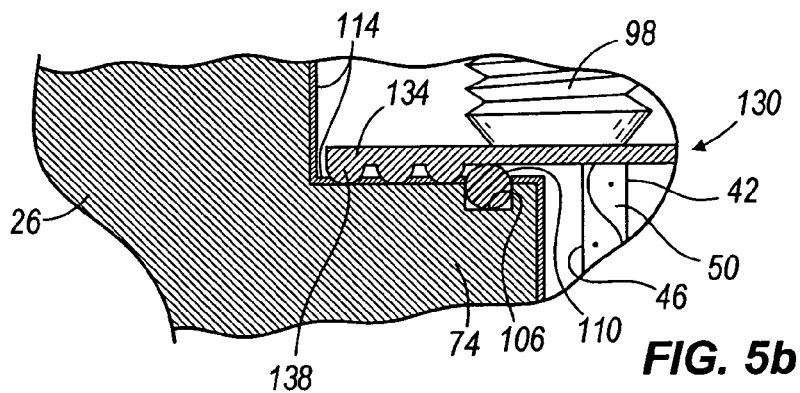
FIG. 5b is an enlarged, cross-sectional view of a portion of the separator tank, illustrating another earth path between the separator tank and a separator element of another construction.
Figure 5C:
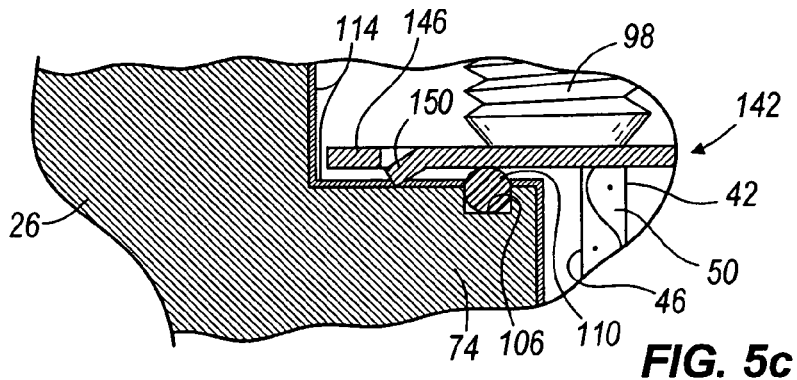
FIG. 5c is an enlarged, cross-sectional view of a portion of the separator tank, illustrating yet another earth path between the separator tank and a separator element of yet another construction.
Figure 5D:
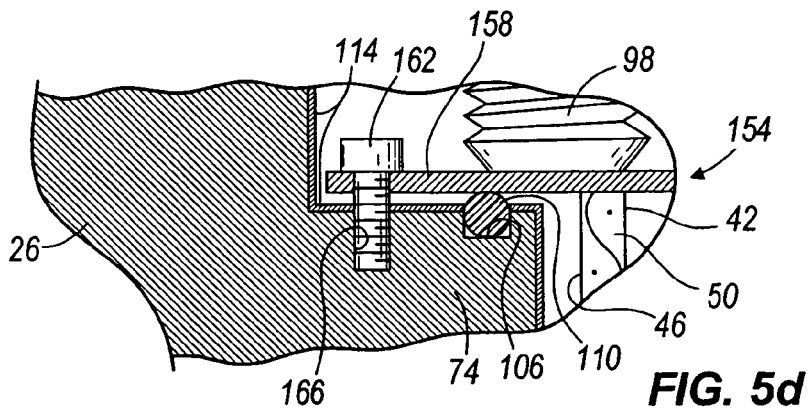
FIG. 5d is an enlarged, cross-sectional view of a portion of the separator tank, illustrating another earth path between the separator tank and a separator element of another construction.

With reference to FIGS. 5b–5d, other methods for forming the earth path between the separator element 38 and the separator tank 26 are shown. As shown in FIG. 5b, another construction of a separator element 130 utilizes an annular flange 134 including a dimpled portion 138 in metal-to-metal contact with the top surface of the ledge 74. During assembly of the separator element 130 and the separator tank 26, the flange 134 is secured to the ledge 74 via the hold-down mechanism 94 as the lid 78 is being secured to the separator tank 26. The dimpled portion 138 of the flange 134 breaks through the coating 114 applied to the ledge 74 such that the dimpled portion 138 and the ledge 74 enjoy metal-to-metal contact, thus forming an earth path between the separator element 130 and the separator tank 26 to ground the separator element 130 to the separator tank 26.

If it is desired to replace the separator element 130, the separator element 130 is replaced using the same general procedure as described above. The action of securing the lid 78 to the separator tank 26 causes the dimpled portion 138 of the flange 134 to break through the coating 114 to form a new earth path between the separator element 130 and the separator tank 26.

As shown in FIG. 5c, yet another construction of a separator element 142 utilizes an annular flange 146 including at least one fold-down tab 150 in metal-to-metal contact with the top surface of the ledge 74. The flange 146 having the fold-down tab 150 functions much like the previously-described flange 134 having the dimpled portion 138 in that the fold-down tab 150 breaks through the coating 114 applied to the ledge 74 upon securing the flange 146 to the ledge 74. The metal-to-metal contact between the fold-down tab 150 and the ledge 74 forms an earth path between the separator element 142 and the separator tank 26 to ground the separator element 142 to the separator tank 26. If it is desired to replace the separator element 142, the separator element 142 is replaced using the same general procedure as described above. The action of securing the lid 78 to the separator tank 26 causes the fold-down tab 150 of the flange 146 to break through the coating 114 to form a new earth path between the separator element 142 and the separator tank 26.

As shown in FIG. 5d, another construction of a separator element 154 utilizes an annular flange 158 that is fastened to the ledge 74. The exemplary construction of FIG. 5d utilizes a conventional screw fastener 162, however, any number of conventional fasteners may be utilized in place of the screw fastener 162 to physically and electrically connect the separator element 154 to the separator tank 26. A corresponding threaded hole 166 is formed in the ledge 74 to receive the screw fastener 162. Preferably, the flange 158 and ledge 74 have three or more correspondingly positioned holes for securing of screw fasteners 162 such that the fasteners 162 secure the flange 158 to the separator tank 26 and the hold-down mechanism may be omitted. Again, it is preferred that the threaded holes 166 are either formed after application of the corrosion-resistant layer 114 or are masked during application corrosion-resistant layer 114.

Upon fastening the flange 158 to the ledge 74, the metal-to-metal contact between the flange 158 and the ledge 74 via the screw fasteners 162 establishes an earth path between the separator element 154 and the separator tank 26. Preferably, the fasteners 162 are made corrosion-resistant metal, such as stainless steel. However, other compatible corrosion-resistant metals may also be used. If it is desired to replace the separator element 154, lid 78 is first removed to gain access to the separator element 154. The screw fasteners 162 are then removed so that the separator element 154 may be removed and a new separator element 154 may be positioned in place. The screw fasteners 162 are then replaced to secure the flange 158 to the ledge 74, thus forming a new earth path between the separator element 154 and the separator tank 26.

What is claimed is:
1. A separator tank assembly comprising:
   a separator tank made from a corrosive metal;
   a corrosion-resistant layer applied over an interior portion of the separator tank;
   a corrosion-resistant metal block coupled to the interior portion of the separator tank, the block being electrically connected with the tank; and a metal separator element positioned within the interior portion of the separator tank, the separator element being coupled to the block and electrically connected with the block.

2. The separator tank assembly of claim 1, further comprising
a ledge extending from the interior portion of the tank, the block being embedded in the ledge, the ledge supporting the separator element;
a lid for sealing the tank, the lid being made from a corrosive metal; and
a corrosion-resistant layer applied over a portion of the lid in facing relationship with the interior portion of the tank.

3. The separator tank assembly of claim 2, wherein the separator element includes an element flange coupled to the ledge, wherein the lid secures the element flange against the ledge, and wherein the flange is in mating contact with a portion of the block protruding past the corrosion-resistant layer to electrically connect the separator element and the ledge.

4. The separator tank assembly of claim 2, wherein the block is press-fit into a recess formed in the ledge.

5. The separator tank assembly of claim 1, wherein the block is made from stainless steel.

6. The separator tank assembly of claim 1, wherein the separator element is made from a non-corrosive metal.

7. The separator tank assembly of claim 1, wherein the corrosion-resistant layer includes paint.

* * * * *